Dec. 3, 1940.     O. WIEDERHOLD     2,223,710
MOTOR VEHICLE GLARE PREVENTING MEANS
Filed April 9, 1940
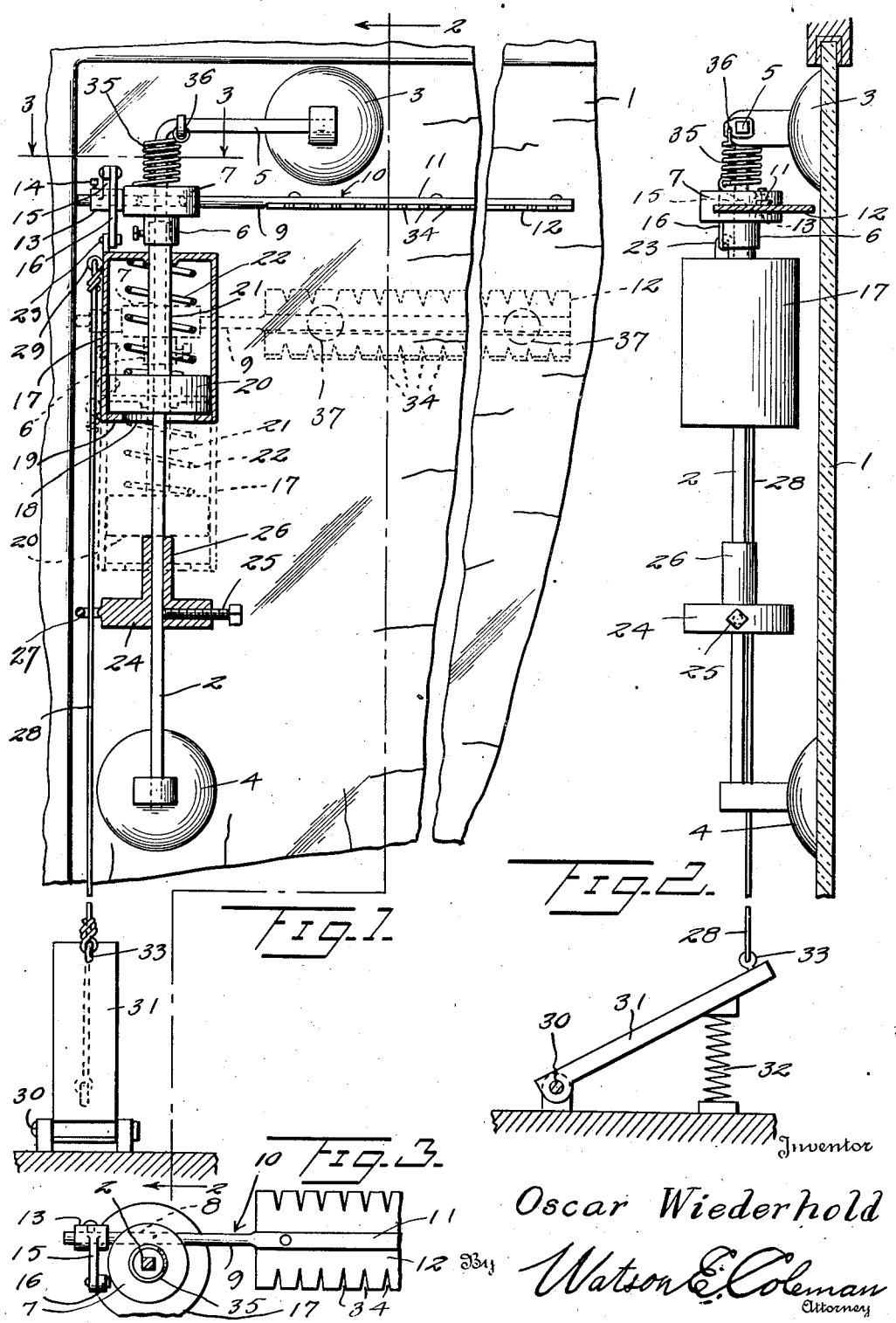
Inventor
Oscar Wiederhold
Watson E. Coleman
Attorney Patented Dec. 3, 1940

2,223,710

UNITED STATES PATENT OFFICE 2,223,710

MOTOR VEHICLE GLARE PREVENTING MEANS

Oscar Wiederhold, Hyattsville, Md.

Application April 9, 1940, Serial No. 328,778

12 Claims. (Cl. 296—97)

This invention relates generally to improvements in glare shields for use upon motor vehicles and pertains particularly to an improved shiftably mounted shield adapted to be readily controlled by the vehicle driver.

Glare shields for motor vehicles at present fall in two groups, one group covering those types in which the shield is mounted above the vehicle windshield or at one side and is adapted to be shifted by hand into a desired position when the driver wishes to protect his eyes from the head lamps of an approaching vehicle, and those shields of the other group comprising translucent sheets of material which are secured to the vehicle windshield in a fixed position so that the driver receives the light rays from approaching headlights through this shield and thereby has the blinding effect of such rays reduced somewhat. These previously known types of glare preventing devices are open to serious objections. With the first type, when the shield is moved into working position so as to intercept the light rays of the headlights of the approaching vehicle, a substantial portion of the vehicle itself is cut out from the driver's view, and with the other type of glare shield which has a fixed position on the windshield, the view of the approaching vehicle is completely obstructed or the visibility of the approaching vehicle is reduced as regards the entire vehicle when the approaching vehicle first comes into view with the result that the difficulty of steering in a manner to avoid the approaching vehicle is greatly increased.

The principal object of the present invention is to provide a glare shield designed to be disposed upon a vehicle windshield, which by being controlled by the foot of the vehicle operator can be vertically shifted to a position where it will be interposed between the eyes of the vehicle driver and the headlights of the approaching vehicle while in a horizontal position, that is, while in a position where its long edge will be presented to the view of the driver, and then turned on its long axis to a desired extent to provide a band or strip between the eyes of the driver and the headlights of the approaching vehicle which will have just sufficient width to block out or obscure only the head lamps of the approaching vehicle, thereby enabling the driver to clearly see the approaching vehicle above and below its head lamps.

Another object of the invention is to provide a motor vehicle glare shield which is supported in such manner that it may be vertically shifted and oscillated on a horizontal axis for the purpose above stated and wherein the oscillation of the shield may be controlled so that the width of the light ray obscuring means between the eyes of the vehicle driver and the head lamps of an approaching vehicle may be increased as desired as the approaching vehicle gets nearer and the head lamps thereof appear to get larger so that the driver has under his control at all times a means of regulating the light ray obscuring device without cutting out his vision of the approaching vehicle above and below its head lamps.

Still another object is to provide in a device of the character described, a vehicle headlight glare shield in which novel means is employed for preventing sudden flashing of the lights from an approaching vehicle into the eyes of the driver of the vehicle upon which the device is mounted in the event that during the time that the shield device is in operation before the eyes of the vehicle driver, the vehicle passes over a rise or a dip in the roadway which would effect the sudden displacement of the shield with respect to the headlights of the approaching car, the said means for preventing the sudden flashing of the lights of the approaching car into the eyes of the vehicle driver being such as to give a warning to the vehicle driver and enable him to make a proper quick adjustment of the shield to prevent his eyes receiving the full glare of the approaching vehicle lights.

The invention will be best understood from a consideration of the following detailed description taken in connection with the accompanying drawing forming part of this specification, with the understanding, however, that the invention may be changed or modified so long as such changes or modifications mark no material departure from the salient features of the invention as expressed in the claims.

In the drawing:

Fig. 1 is a view partly in elevation and partly in vertical section of the device embodying the present invention showing the same applied to a vehicle windshield and in inoperative position.

Fig. 2 is a sectional view taken on the line 2—2 of Fig. 1.

Fig. 3 is a fragmentary sectional view taken on the line 3—3 of Fig. 1.

Referring now more particularly to the drawing, the numeral 1 indicates a portion of a vehicle windshield, the same being viewed from the inside of the vehicle and showing the device embodying the present invention mounted thereon in the upper left-hand corner thereof.

The present device comprises a fixed support in the form of a rod or bar 2 which is preferably of rectangular cross-section as shown in Fig. 3, and which has rubber suction cups 3 and 4 attached to its upper and lower ends respectively. This bar is here shown as having its upper end turned to extend at right angles, as indicated at 5, in conformity with the angular upper corner of the windshield, but it is obvious that the bar may be straight throughout if desired.

Mounted upon the bar 2 adjacent its upper end is a collar 6 which has a passage formed therethrough which is of the same cross-sectional formation as the bar 2, so that this collar, while having movement longitudinally of the bar, cannot rotate thereon. The collar has formed integrally therewith the encircling flange portion 7 through which is formed a passage 8 which extends perpendicularly to the supporting rod 2 and which forms a bearing for the round end portion 9 of a horizontal arm which is indicated generally by the numeral 10. The major portion of this arm from the part 7 of the collar is flattened, as indicated at 11 and is disposed against and extends longitudinally of one face of a glare shield 12. This glare shield is here shown as being in the form of a relatively long strip of thin material which may be of any suitable character and which may be opaque or translucent as desired. The bar 10 extends along the longitudinal center of this glare shield strip and thus when the bar is oscillated, the strip will be turned on its long axis from a normal horizontal position where it has a long edge directed toward the eyes of the vehicle driver or, in other words, where it lies in a plane paralleling the line of vision of the driver, to a vertical position in which its surface is disposed in a plane perpendicular to the line of vision of the driver.

Upon the side of the collar 6 opposite from the glare shield 12, there is secured upon the end 9 of the glare shield supporting arm, a sleeve 13. This sleeve is secured in a suitable manner to facilitate its adjustment around the shaft end 10 of the arm, the means here shown comprising a set screw 14 which engages the end of the arm. Connected with this sleeve is a radially extending arm 15 to the outer end of which is pivotally attached one end of a depending link 16.

The numeral 17 designates a cylinder through the center of which the supporting bar 2 passes. The lower end of this cylinder is open, as indicated at 18, but has an inturned flange 19 for the purpose hereinafter stated. Within the cylinder 17 is a shiftable body or piston 20 which has an elongated tubular stem 21 through which the supporting rod 2 passes and the free end of this tubular stem extends into the collar 6 and is secured thereto so as to move therewith.

The inturned flange 19 of the cylinder limits the movement of the piston 20 in one direction therein, in the present illustrated structure downwardly, and interposed between the piston 20 and the closed upper end of the cylinder is an expansion spring 22 which normally urges the piston 20 toward the open end of the cylinder. The free lower end of the link 16 is pivotally attached to the cylinder 17, as indicated at 23, and thus it will be seen that under the circumstances hereinafter described, a prescribed movement of the cylinder on the rod 2 will pull upon the link 16 and effect the oscillation of the shield carrying arm 10 on its long axis.

The numeral 24 designates a stop disk through the center of which the bar 2 passes, this disk being secured to the bar in adjusted position thereon by the set screw 25. Integral with this disk is a tubular stem 26 through which the bar 2 passes and which is directed toward the opening 18 of the cylinder 17, through which opening this stem is adapted to pass as hereinafter stated. This stem constitutes a stop for the piston 20 while the disk forms a stop for the flanged end of the cylinder 17. At the periphery of the disk 24, a guide eye 27 is formed and through this passes a pull cable or strand 28 which is preferably of light weight woven wire. The upper end of the strand 28 is attached to the remote or upper end of the cylinder 17 by means of the eye 29 which is joined to the cylinder.

Upon the floor of the vehicle directly beneath the eye 29 there is pivotally mounted, as at 30, a treadle 31 beneath which is an expansion spring 32 which normally tends to raise its free end. This treadle carries an eye or any other suitable means 33 by which the lower end of the strand or cable 28 is attached thereto.

The glare shield 12 is provided along its longitudinal edges with the relatively closely spaced V-notches 34. By the provision of these notches, it will be seen that when the shield is interposed between the eyes of the car driver and a light projector facing the driver, if it is turned back to its horizontal position as shown in full lines in Fig. 1, the light rays will be permitted to pass gradually over the longitudinal edges of the shield to the eyes of the driver rather than be uncovered quickly and thus flash into the eyes of the driver as would be the case if the long edges of the shield were unbroken. In some instances, the necessity for removing the glare shield from before the eyes of the driver may arise, in which case it will be seen that the driver's eyes will not suddenly receive the full glare of light from a facing light projector, but the rays from the light beam will be gradually permitted to get stronger as the shield oscillates back to its horizontal position.

In referring to the horizontal position of the shield here and in the claims, it is to be understood that by this is meant that position of the shield wherein the side faces are in a horizontal plane or in a plane parallel with the line of vision of the vehicle operator, and reference to a vertical position means that position of the shield wherein the side faces thereof are in a vertical plane or in a plane perpendicular to the line of vision of the driver, while the long axis of the shield remains horizontal as it does at all times.

The normal position of the shield 12 is horizontal and out of the line of vision of the operator of the vehicle. In the form of the device here illustrated, the shield when in normal position is above the line of vision of the vehicle operator, but it will be readily appreciated that by reversal of the parts it may assume a normal position where it will be below the driver's line of vision. In either instance, the initial movement of the shield would be in a vertical path and while the description of the operation of the device as hereinafter given will set forth the movement of the shield 12 as being initially downwardly from a raised position, it is to be understood that the invention contemplates the provision of a structure wherein such movement may be upwardly as well as downwardly.

In order to maintain the shield 12 in its normal raised position, there is provided the contractile spring 35 which may encircle the upper end of the rod 2 as shown, the upper end of the spring being secured to the rod in a suitable manner as indicated at 36, while its lower end is coupled with the upper part 7 of the shiftable collar 6.

In the operation of the device as here illustrated, the double stop 24—26 will first be set in a position upon the rod 2 to suit the height of the operator of the vehicle so that when the treadle 31 is depressed, the entire mechanism with the exception of the rod 2 and the stops, will move downwardly until the shield 12, still maintaining its horizontal position, comes into a position where it will be interposed between the eyes of the vehicle driver and the head lamps of an approaching vehicle. In this position the piston 20 will be in contact with the stop 26, therefore, further vertical movement of the shield 12 will be prevented. However, the cylinder 17 may continue to move downwardly until its flanged lower end contacts the stop ring 24 but the operator, by manipulation of the treadle 31, may move the cylinder to any position he desires between the upper end of the stop 26 and the stop ring 24 so as to oscillate the shield 12 on its long axis to a desired extent. After the piston 20 comes to rest upon the stop 26, further downward pull on the cylinder will effect the turning of the shield supporting arm 10 through the medium of the arm and link mechanism 15—16 and this turning or oscillation of the shield may be continued by the driver until a sufficiently wide strip of the shield has been interposed between his eyes and the head lamps of the aproaching vehicle to just cover the lamps and block out the light therefrom.

Fig. 1 shows in dotted outline a lowered oscillated position for the shield 12 wherein it presents a light obstructing strip between the driver's eyes and the vehicle head lamps of sufficient width to just cover such head lamps, the latter being shown in dotted outline and indicated by the numeral 37.

From the foregoing, it will be readily seen that the device herein disclosed provides an effective means by which glare from the head lamps of an approaching vehicle may be cut off from the eyes of a vehicle driver without at the same time obstructing that driver's view of any part of the approaching vehicle excepting a narrow portion corresponding with the diameter of the vehicle's head lamps. In actual practice, it is shown that by the use of the present device, the head lamps of the approaching vehicle are completely blocked out and the driver is able to see not only the top part of the vehicle above the head lamps and the lower part below the head lamps, but may see the face of the driver of the approaching vehicle. The device blocks out the headlights of the approaching vehicle for the driver of the machine in which the device is mounted so as to give the effect of such approaching lights being turned off by the operator of the approaching vehicle.

What is claimed is:

1. A motor vehicle glare preventing device, comprising a flat shield, means for supporting such shield before a vehicle windshield in horizontal position and removed from a driver's line of vision, means forming a part of the supporting means for shifting the shield vertically and with its width coplanar with said line of vision into the driver's line of vision, and means for turning the shield on an axis coplanar with the width of the shield and extending perpendicular to the driver's line of vision.

2. A motor vehicle glare preventing means, comprising an elongated flat shield strip, a support for said shield strip by which the strip is maintained in horizontal position outside the vehicle driver's line of vision and having its width extending horizontally, means for vertically shifting the shield strip on the support into the driver's line of vision while maintaining its horizontal position, and means for effecting the oscillation of the shield strip upon its long axis while maintaining the strip across the said line of vision.

3. A glare preventing device for motor vehicles, comprising an elongated flat shield, a supporting member adapted to be secured to a vehicle windshield, an arm attached to said flat shield, means connecting said arm with said support facilitating both the vertical movement of the arm in horizontal position and the axial turning of the arm, means connected with the arm for effecting its vertical movement, means limiting the vertical movement of the arm to a position in which the shield is interposed within the vehicle driver's line of vision while its flat sides are horizontal, and means facilitating the turning of the shield and arm upon the long axis of the latter while the shield is in said line of vision.

4. A motor vehicle glare preventing device, comprising a vertically disposed supporting rod, an arm mounted upon said rod to extend perpendicularly thereto and to have vertical movement thereon and axial movement with respect thereto, means normally maintaining said arm in a position with respect to an adjacent windshield out of the line of the vehicle driver's vision, an elongated flat shield strip secured lengthwise to said arm and having a horizontal position when the arm is in normal position, means for effecting vertical movement of the arm on said rod to bring the shield strip within the driver's line of vision, and means for turning said arm on its long axis while the shield strip is within such line of vision.

5. A motor vehicle glare preventing device, comprising a vertically disposed supporting rod adapted to be disposed at a side of a vehicle windshield, a collar slidably mounted upon the rod, an arm having an end rotatably supported by the collar to extend perpendicularly to the rod, an elongated flat glare shield strip secured lengthwise to said arm, resilient means normally urging the collar to a position on the rod where the arm and glare strip are out of line with a driver's vision, said strip being horizontally disposed with respect to the flat sides thereof, means facilitating the sliding of the collar on the rod to bring said strip into the vehicle driver's line of vision, and means for effecting the rocking of the arm on its long axis to turn the strip while it is within the said line of vision.

6. A motor vehicle glare preventing device, comprising a vertically disposed supporting rod adapted to be disposed at a side of a vehicle windshield, a collar slidably mounted upon the rod, an arm having an end rotatably supported by the collar to extend perpendicularly to the rod, an elongated flat glare shield strip secured lengthwise to said arm, resilient means normally urging the collar to a position on the rod where the arm and glare strip are out of line with a driver's vision, said strip being horizontally disposed with respect to the flat sides thereof, means facilitating the sliding of the collar on the rod to bring said strip into the vehicle driver's line of vision, a stop carried by the rod by which the movement of the collar is limited to locate the shield strip in the driver's line of vision, and mechanism coupled with said arm facilitating the rocking of the arm on its long axis while the strip is maintained in the said line of vision.

7. A motor vehicle glare preventing device, comprising an elongated flat glare shield, means for supporting said glare shield horizontally in front of the motor vehicle driver and out of the line of the driver's vision, means for moving the glare shield into the driver's line of vision while maintaining the shield in the said horizontal position, means for oscillating the glare shield on its long axis while it is within the driver's line of vision, and means for preventing the abrupt exposure of the driver's eyes to light rays interrupted by the shield when the shield is oscillated in one direction, consisting of serrations formed along the longitudinal edges of the shield.

8. A motor vehicle glare preventing device, comprising a supporting rod, means for mounting said rod vertically upon a windshield, a collar slidably mounted upon the rod, a spring connecting the collar with the rod and normally urging the collar upwardly thereon, an arm having an end rotatably coupled with the collar and extending perpendicularly to the rod, an elongated flat glare shield secured lengthwise to the arm, the glare shield being in a horizontal position with respect to the side faces thereof when the collar and arm are at the limit of their upward movement on the rod, a cylinder disposed beneath the collar and having the rod extending longitudinally therethrough, the lower end of the cylinder being open, a piston within the cylinder, the piston having a tubular stem connected with the collar and through which the rod passes, resilient means within the cylinder normally urging the piston downwardly therein, means preventing the movement of the piston out of the lower end of the cylinder, a stop member carried upon the rod beneath the piston and adapted to enter the cylinder for engagement by the piston, a second stop member disposed beneath the first stop member for limiting the downward movement of the cylinder, an operative connection between the cylinder and said arm by which the arm is turned on its long axis by the downward movement of the cylinder after the movement of the piston is stopped by the first stop member, and means connected with the cylinder facilitating movement of the same downwardly on the rod.

9. A headlight glare eliminating shield for motor vehicles, consisting of a thin strip of material supported in the vehicle driver's line of vision between the driver and the windshield to extend in a direction transversely of the windshield with its width substantially horizontal, said strip having a length and a width sufficient only when disposed with its width vertical in said line of vision to block out the headlights of an approaching vehicle through the height and width of such headlights without obstructing the vehicle driver's view of the approaching vehicle above and below the headlights thereof, and means coupled with said strip which is so constructed and arranged that a continuous turning of the strip on its long axis may be effected during the approach of said other vehicle to vary the effective width of the strip between said horizontal and vertical positions.

10. A headlight glare eliminating shield for motor vehicles, consisting of a thin shield supported in advance of the vehicle driver's eyes and having a width extending coplanar with the line of the driver's vision, and means for continuously turning said shield on its own longitudinal axis during the approach of another vehicle to vary the effective width of the shield in said line of vision to block out the headlights of the approaching car as the apparent size of said lights changes without blocking out vision of the approaching car above and below said headlights for the vehicle driver.

11. A headlight glare eliminating shield for motor vehicles, consisting of a single thin elongated shield supported to be moved to a position in advance of the vehicle driver's eyes with the width of the shield extending in the direction of and lying in the line of the driver's vision, the shield having its length extending substantially horizontally across said line of vision, means supporting the shield for rotation on its own longitudinal axis, and means for turning the shield on said axis to any position between the position where the width is horizontal to a position where the width is vertical for varying the effective width of the shield when another vehicle is approaching to block out the headlights of an approaching car without blocking out the vehicle driver's vision of the approaching car above and below the headlights thereof.

12. A motor vehicle glare preventing device, comprising a vertically disposed supporting rod, an elongated flat shield strip connected at one end to said rod to extend perpendicularly thereof and to have movement longitudinally of the rod, said strip further having rotational movement on its long axis, means normally maintaining the strip in a position with respect to an adjacent windshield out of the line of the driver's vision, means for effecting movement of the strip longitudinally of the rod to bring the strip within the driver's line of vision, and means for turning the shield strip on said long axis while the strip is within such line of vision.

OSCAR WIEDERHOLD.